United States Patent
Keller et al.

(10) Patent No.: US 10,609,131 B2
(45) Date of Patent: Mar. 31, 2020

(54) NON-DISRUPTIVE ENABLEMENT OF HIGHLY AVAILABLE CLOUD COMPUTING SERVICES

(71) Applicant: Citrix Systems, Inc., Fort Lauderdale, FL (US)

(72) Inventors: Steven A. Keller, Coral Springs, FL (US); Thomas J. Hammond, Coconut Creek, FL (US); Thomas Michael Kludy, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 54 days.

(21) Appl. No.: 15/869,341

(22) Filed: Jan. 12, 2018

(65) Prior Publication Data
US 2019/0222638 A1  Jul. 18, 2019

(51) Int. Cl.
*G06F 15/177* (2006.01)
*H04L 29/08* (2006.01)
(Continued)

(52) U.S. Cl.
CPC ........ *H04L 67/101* (2013.01); *H04L 41/0806* (2013.01); *H04L 41/5051* (2013.01);
(Continued)

(58) Field of Classification Search
CPC . H04L 67/101; H04L 41/5051; H04L 47/122; H04L 61/1511; H04L 67/1021; H04L 41/5096
(Continued)

(56) References Cited

U.S. PATENT DOCUMENTS

| | | | |
|---|---|---|---|
| 9,609,017 B1* | 3/2017 | Gilbert | H04L 63/1458 |
| 2007/0174426 A1* | 7/2007 | Swildens | H04L 12/14 709/217 |

(Continued)

OTHER PUBLICATIONS

Rouse, Margaret "Application Program Interface" http://searchmicroservices.techtarget.com/definition/application-program-interface-API website visited on Jan. 12, 2018 pp. 1-12.
(Continued)

*Primary Examiner* — Alan S Chou
(74) *Attorney, Agent, or Firm* — Banner & Witcoff, Ltd.

(57) ABSTRACT

Methods, systems, and non-transitory computer-readable media are described herein. In some embodiments, a computing platform may deploy a cloud application comprising a first instance of the cloud application. Further, the computing platform may direct a DNS to the first instance of the cloud application. Next, the computing platform may determine that a second instance of the cloud application should be deployed. Additionally, the computing platform may create a first global traffic manager configured with at least a first endpoint and a second endpoint, where the first endpoint is associated with the first instance and is enabled, and where the second endpoint is associated with the second instance, and is disabled. Subsequently, the computing platform may direct the DNS to the first global traffic manager. The computing platform may then direct the DNS to the first global traffic manager, enable the second endpoint. In addition, the computing device may direct, based on metadata associated with each of a plurality of users, each of the plurality of users to one of the first instance and the second instance, wherein one or more users are directed to each of the first instance and the second instance.

20 Claims, 6 Drawing Sheets

(51) Int. Cl.
*H04L 29/12* (2006.01)
*H04L 12/24* (2006.01)
*H04L 12/803* (2013.01)

(52) U.S. Cl.
CPC ........ *H04L 47/122* (2013.01); *H04L 61/1511* (2013.01); *H04L 67/1021* (2013.01); *H04L 41/5096* (2013.01)

(58) Field of Classification Search
USPC .......................................................... 709/222
See application file for complete search history.

(56) References Cited

U.S. PATENT DOCUMENTS

| | | | | |
|---|---|---|---|---|
| 2012/0110148 | A1* | 5/2012 | Liu | H04L 29/12066 709/220 |
| 2015/0058467 | A1* | 2/2015 | Douglas | G06Q 10/0631 709/223 |
| 2015/0200868 | A1* | 7/2015 | Swildens | G06F 9/50 709/226 |
| 2016/0119202 | A1* | 4/2016 | Iyer | G06F 9/5072 714/37 |
| 2017/0187583 | A1* | 6/2017 | Beltt | H04L 41/5009 |

OTHER PUBLICATIONS

"Application Programming Interface" Wikipedia https://en.wikipedia.org/wiki/Application_programming_interface website visited on Jan. 12, 2018 pp. 1-4.

Rouse, Margaret "Cloud Application" http://searchcloudapplications.techtarget.com/definition/cloud-application website visited Jan. 12, 2018 pp. 1-11.

"Cloud Instances (Single/Multi-Instance)" https://apprenda.com/library/glossary/definition-cloud-instance-single-multi/ website visited Jan. 12, 2018 pp. 1-4.

"Domain Name System" https://en.wikipedia.org/wiki/Domain_Name_System website visited Jan. 12, 2018 pp. 1-19.

"How do API Gateways work" https://stackoverflow.com/questions/11331386/how-do-api-gateways-work website visited Jan. 12, 2018 pp. 1-3.

"How to CNAME to Amazon API Gateway Endpoint" https://stackoverflow.com/questions/36737313/how-to-cname-to-amazon-api-gateway-endpoint website visited Jan. 12, 2018 pp. 1-3.

"How to verify that SRV DNS records have been created for a domain controller" https://support.microsoft.com/en-us/help/816587/how-to-verify-that-srv-dns-records-have-been-created-for-a-domain-cont website visited Jan. 12, 2018 pp. 1-3.

"Windows SharePoint Services Web Services" https://msdn.microsoft.com/en-us/library/ms479390(v=office.12).aspx website visited Jan. 12, 2018 pp. 1-2.

"SRV Record" https://en.wikipedia.org/wiki/SRV_record website visited Jan. 12, 2018 pp. 1-5.

* cited by examiner

NON-DISRUPTIVE ENABLEMENT OF HIGHLY AVAILABLE CLOUD COMPUTING SERVICES

FIELD

Aspects described herein generally relate to computers, networking, hardware, and software. More specifically, one or more aspects of the disclosure relate to managing stored data used by services, and in particular, enabling the data to support multiple geographies in a non-disruptive manner.

BACKGROUND

Developers of cloud based applications are increasingly looking for ways to deploy updates and additional instances of their cloud based applications without causing disruption to end users. As cloud based applications are more frequently adopted and used, it is increasingly important to eliminate this disruption in order to improve availability of the cloud based applications. For example, developers may schedule downtime, during which they may deploy updates and additional instances. However, this causes disruption to end users attempting to access the cloud based applications. In some instances, this may present technical challenges. There remains an ever-present need to improve methods for deploying updates and additional instances of cloud based applications.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards implementation of a global traffic manager that may be used to route requests for access to cloud-based applications based on geographic, or other, metadata comprising the requests. This may allow for additional instances of the cloud based application to be deployed without causing technical challenges, such as downtime or disruption to the end user.

Methods, systems, and non-transitory computer-readable media are described herein. In some embodiments, a computing platform may deploy a cloud application comprising a first instance of the cloud application. Further, the computing platform may direct a DNS to the first instance of the cloud application. Next, the computing platform may determine that a second instance of the cloud application should be deployed. Additionally, the computing platform may create a first global traffic manager configured with at least a first endpoint and a second endpoint, where the first endpoint is associated with the first instance and is enabled, and where the second endpoint is associated with the second instance, and is disabled. Subsequently, the computing platform may direct the DNS to the first global traffic manager. The computing platform may then direct the DNS to the first global traffic manager, enable the second endpoint. In addition, the computing platform may direct, based on metadata associated with each of a plurality of users, each of the plurality of users to one of the first instance and the second instance, wherein one or more users are directed to each of the first instance and the second instance.

In some examples, the first endpoint may be associated with a first geographic region and the second endpoint may be associated with a second geographic region.

In some instances, the computing platform may determine, based on the metadata, that the one of the plurality of users has relocated from the first geographic region to a third geographic region. Further, the computing platform may create, based on the determining that the one of the plurality of users has relocated, a third instance of the cloud application for the third geographic region. Next, the computing platform may create a third endpoint associated with the third instance of the cloud application, wherein the third endpoint is disabled. Additionally, the computing platform may enable the third endpoint. The computing platform may then direct, based on the metadata, the one of the plurality of users to the third instance.

In some examples, the first global traffic manager may comprise a switching mechanism that enables geographic load distribution and diverts the plurality of users to a plurality of geographic regions including at least the first geographic region and the second geographic region. The switching mechanism may not cause disruption to the cloud application or the plurality of users.

In some instances, the computing platform may determine that the cloud application comprises a plurality of cloud services.

In some examples, the computing platform may determine that the first instance supports a first service of the plurality of cloud services. Further, the computing platform may determine that a second service of the plurality of cloud services should be supported by the first instance. Next, the computing platform may create, at the first endpoint, a second global traffic manager, configured with a least a third endpoint and a fourth endpoint, wherein the third endpoint is associated with the first service of the plurality of cloud services and the fourth endpoint is associated with the second service of the plurality of cloud services. Additionally, the computing platform may direct, after directing the DNS to the first global traffic manager, requests for the first instance of the cloud application to the second global traffic manager. Subsequently, the computing platform may enable the fourth endpoint, and may direct, based on the requests, each of the requests to one of the first service and the second service.

In some examples, the computing platform may deploy, prior to the creation of the first global traffic manager, the cloud application.

In some instances, the cloud application may comprise a DNS based web service comprising at least one cloud-based application uniform resource locator (URL). Further, the at least one cloud-based application URL may be known by the plurality of users.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards deploying a global traffic manager that may be used to route requests for access to cloud-based applications based on geographic, or other, metadata comprising the requests. The global traffic manager may be configured with multiple endpoints, each associated with an instance of a cloud-based application. The different endpoints may each be associated with a different geographic location. Upon creation, each endpoint may be disabled until access requests are directed towards the global traffic manager. Once the requests are directed towards the global traffic manager, the global traffic manager may route the requests to one of the endpoints based on metadata comprising the requests. This may allow a system to introduce additional cloud-based services into multiple geographic regions without scheduled downtime or disruption to the end users of the cloud-based application.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
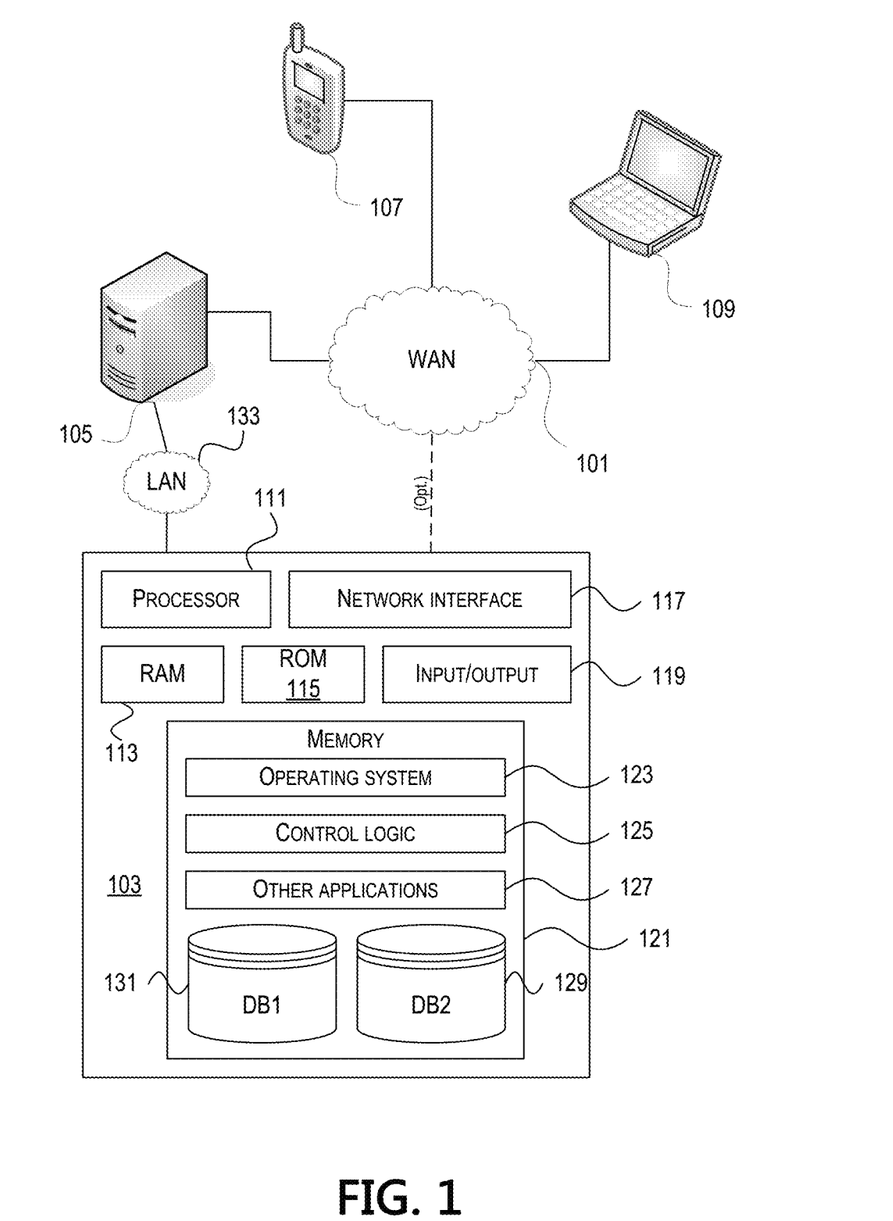
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
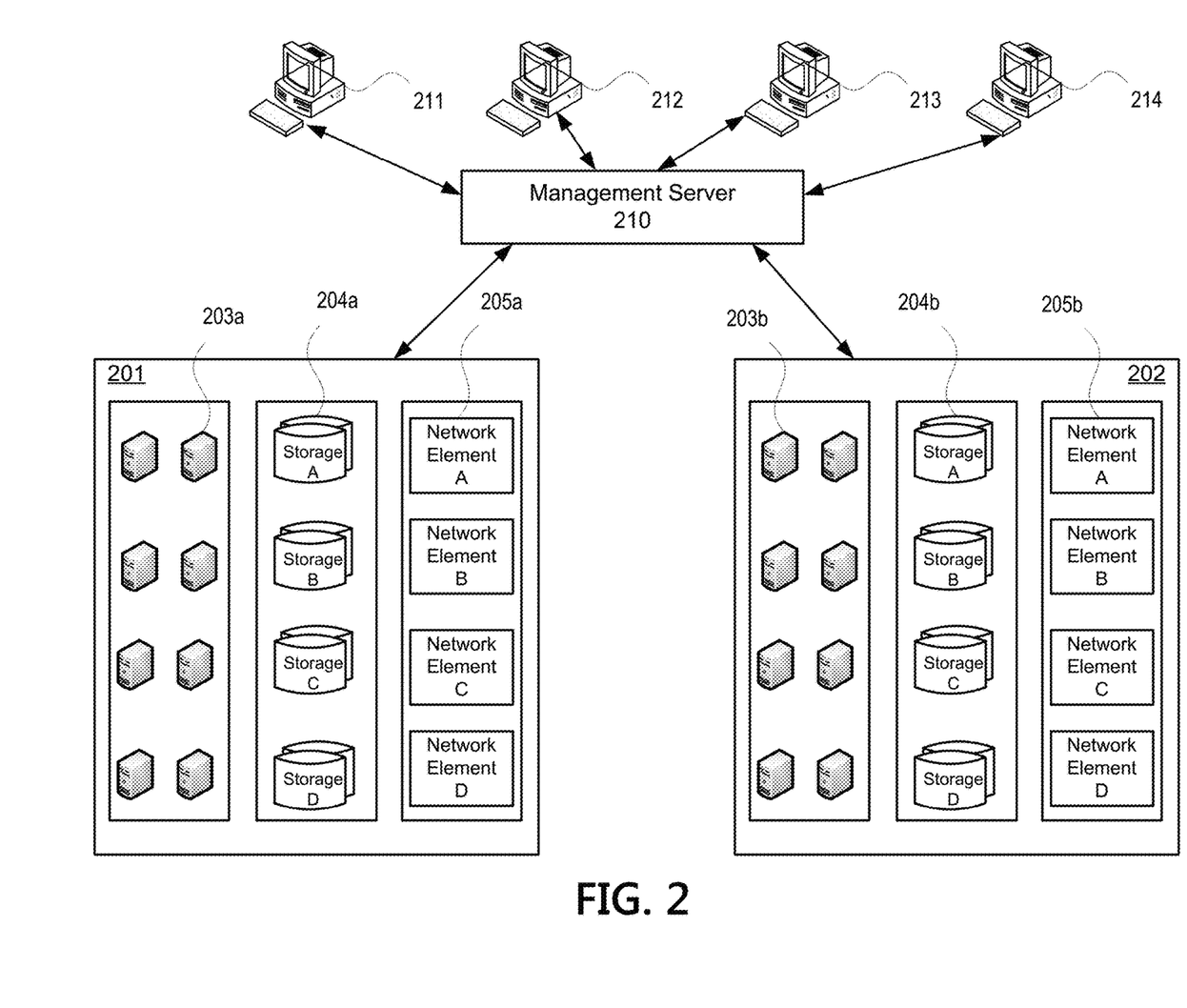
FIG. 2 depicts an illustrative cloud-based system architecture that may be used in accordance with one or more illustrative aspects described herein.

With further reference to FIG. 2, some aspects described herein may be implemented in a cloud-based environment. FIG. 2 illustrates an example of a cloud computing environment (or cloud system). As seen in FIG. 2, client computers 211-214 may communicate with a cloud management server 210 to access the computing resources (e.g., host servers 203*a*-203*b* (generally referred herein as "host servers 203"), storage resources 204*a*-204*b* (generally referred herein as "storage resources 204"), and network resources 205*a*-205*b* (generally referred herein as "network resources 205")) of the cloud system.

Management server 210 may be implemented on one or more physical servers. The management server 210 may run, for example, CLOUDPLATFORM by Citrix Systems, Inc. of Ft. Lauderdale, Fla., or OPENSTACK, among others. Management server 210 may manage various computing resources, including cloud hardware and software resources, for example, host computers 203, data storage devices 204, and networking devices 205. The cloud hardware and software resources may include private and/or public components. For example, a cloud may be configured as a private cloud to be used by one or more particular customers or client computers 211-214 and/or over a private network. In other embodiments, public clouds or hybrid public-private clouds may be used by other customers over an open or hybrid networks.

Management server 210 may be configured to provide user interfaces through which cloud operators and cloud customers may interact with the cloud system. For example, the management server 210 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 210 also may include a set of APIs and/or one or more customer console applications with user interfaces configured to receive cloud computing requests from end users via client computers 211-214, for example, requests to create, modify, or destroy virtual machines within the cloud. Client computers 211-214 may connect to management server 210 via the Internet or some other communication network, and may request access to one or more of the computing resources managed by management server 210. In response to client requests, the management server 210 may include a resource manager configured to select and provision physical resources in the hardware layer of the cloud system based on the client requests. For example, the management server 210 and additional components of the cloud system may be configured to provision, create, and manage virtual machines and their operating environments (e.g., hypervisors, storage resources, services offered by the network elements, etc.) for customers at client computers 211-214, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 211-214 may be related, for example, different client computers creating virtual machines on behalf of the same end user, or different users affiliated with the same company or organization. In other examples, certain clients 211-214 may be unrelated, such as users affiliated with different companies or organizations. For unrelated clients, information on the virtual machines or storage of any one user may be hidden from other users.

Referring now to the physical hardware layer of a cloud computing environment, availability zones 201-202 (or zones) may refer to a collocated set of physical computing resources. Zones may be geographically separated from other zones in the overall cloud of computing resources. For example, zone 201 may be a first cloud datacenter located in California, and zone 202 may be a second cloud datacenter located in Florida. Management server 210 may be located at one of the availability zones, or at a separate location. Each zone may include an internal network that interfaces with devices that are outside of the zone, such as the management server 210, through a gateway. End users of the cloud (e.g., clients 211-214) might or might not be aware of the distinctions between zones. For example, an end user may request the creation of a virtual machine having a specified amount of memory, processing power, and network capabilities. The management server 210 may respond to the user's request and may allocate the resources to create the virtual machine without the user knowing whether the virtual machine was created using resources from zone 201 or zone 202. In other examples, the cloud system may allow end users to request that virtual machines (or other cloud resources) are allocated in a specific zone or on specific resources 203-205 within a zone.

In this example, each zone 201-202 may include an arrangement of various physical hardware components (or computing resources) 203-205, for example, physical hosting resources (or processing resources), physical network resources, physical storage resources, switches, and additional hardware resources that may be used to provide cloud computing services to customers. The physical hosting resources in a cloud zone 201-202 may include one or more computer servers 203, such as the virtualization servers 301 described above, which may be configured to create and host virtual machine instances. The physical network resources in a cloud zone 201 or 202 may include one or more network elements 205 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 201-202 may include storage disks (e.g., solid state drives (SSDs), magnetic hard disks, etc.) and other storage devices.

Figure 3:
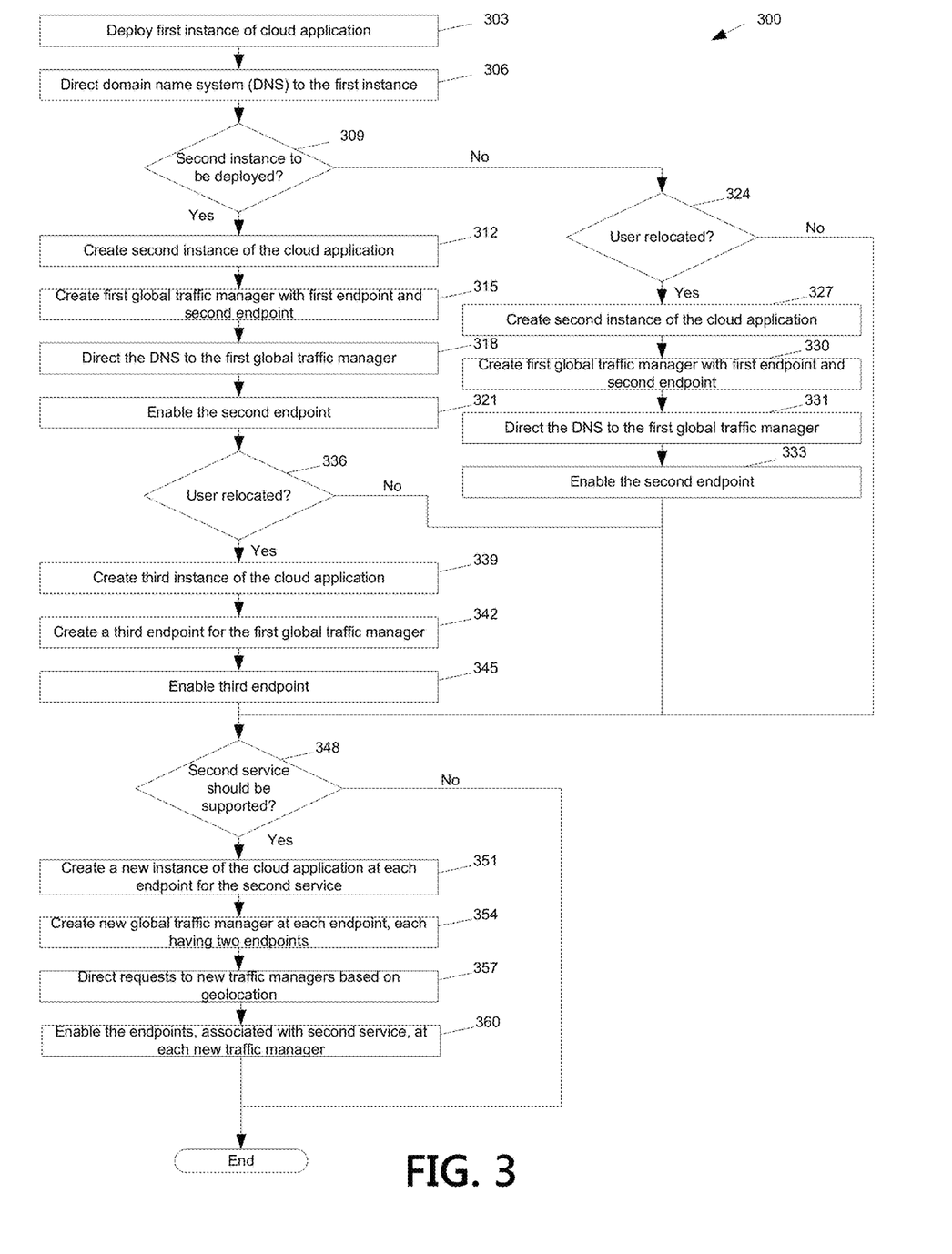
FIG. 3 illustrates an example method for enabling cloud-based application services without causing a disruption to users of the cloud-based application services in accordance with one or more illustrative aspects described herein.

The example cloud computing environment shown in FIG. 2 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 203 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Non-Disruptive Enablement of Highly Available Cloud Computing Services

FIG. 3 illustrates an example method for enabling cloud-based application services without causing a disruption to users of the cloud-based application services in accordance with one or more illustrative aspects described herein. Referring to FIG. 3, at step 303, a system may deploy a first instance of a cloud-based application. For example, a cloud-based application such as WINDOWS™ SHAREPOINT™ SERVICES (WSS) may be created. The cloud-based application may comprise a domain name system (DNS) based web service comprising at least one cloud-based application uniform resource locator (URL). The at least one cloud-based application URL may be known by system users.

At step 306, a plurality of users may establish internet connections and may each access the cloud-based application via a web browser. For example, a user may log onto a computer, establish an internet connection, and request access to an application (e.g., WSS, or the like) on the CITRIX CLOUD™. The computer may query a DNS server for access to the cloud-based application. In response to the query, the DNS server may request access to resource records comprising the application from various cloud computing resources such as those described above with regard to FIG. 2. For example, the DNS server may request access from an A/B router or a canary server.

At step 309, the system may determine whether a second instance of the cloud-based application should be deployed. For example, the system may determine whether traffic to the cloud-based application from user in a new geographic region exceeds a predetermined threshold. For example, the system may monitor metadata associated with various requests to access the cloud-based application, and may determine that a percentage of the requests, exceeding a predetermined threshold, originate in the new geographic region. As a specific example, a number of users attempting to access WSS on the CITRIX CLOUD™ from Europe may exceed the predetermined threshold.

Additionally or alternatively, the system may preemptively determine that the second instance of the cloud-based application should be deployed. For example, the traffic from the new geographic region may not yet exceed the predetermined threshold, but predictive models or predictive forecasting may indicate that the traffic will increase. As a result, the system may determine that the second instance should be deployed, and may proceed to step 312 to create the second instance of the cloud application.

At step 312, the system may create the second instance of the cloud application. For example, the system may copy the resource records associated with the first instance of the cloud application, and may modify, at the second instance, the service (SRV) records based on the new geographic region. For example, the system may determine that the second instance of the cloud application should serve users in Europe instead of the United States, which may be served by the first instance. In this example, the system may change a resource record of "<service>us.ctxwsstgapi.net" to "<service>eu.ctxwsstgapi.net."

At step 315, the system may create a first global traffic manager comprising a first endpoint and a second endpoint. The first endpoint may be associated with the first instance and the second endpoint may be associated with the second instance. The first global traffic manager may comprise a switching mechanism that enables geographic load distribution and diverts a plurality of system users to a plurality of geographic regions. The switching mechanism may not cause disruption to the cloud-based application or the plurality of system users. For example, the first global traffic manager may comprise a global server load balancing device (GSLB), a router, or a part of the management server 210. Upon creation of the first global traffic manager, access to the first endpoint via the first global traffic manager may be enabled, but access to the second endpoint via the first global traffic manager may be disabled.

At step 318, once the first global traffic manager is created, the system may direct the DNS to the first global traffic manager rather than towards the cloud computing resources that previously hosted the first instance of the cloud application. For example, the system may switch a DNS address from the first instance to the first global traffic manager. Thus, requests for the cloud-based application may be transmitted to the first global traffic manager, and subsequently redirected to the first endpoint. Thus, DNS requests for the cloud application may still all be routed to the first instance, but they will all be routed via the first global traffic manager rather than merely directly to the first instance. For example, all requests to access WSS via the CITRIX CLOUD™ may be sent to the first global traffic manager.

At step 321, once the first global traffic manager is in place, the system may enable the second endpoint. Once enabled, the system may use the first global traffic manager to route requests to one of the first endpoint and the second endpoint based on metadata associated with the user requesting the access to the cloud application. For example, if the metadata indicates that the user is located in the United States, the first global traffic manager may route the request to the first endpoint, thus providing the user with access to the first instance of the cloud-based application. If the metadata indicates that the user is located in Europe, the first global traffic manager may route the request to the second endpoint, thus providing the user with access to the second instance of the cloud-based application. This allows the cloud-based application to function as it did before, the difference being that the first global traffic manager now routes the requests for the cloud-based application based on metadata. This may allow for creation of an additional instance of the cloud-based application without causing downtime to the original system or system users.

In addition, the first global traffic manager may be used to enable or disable any of the endpoints without impact to the system users. For example, an update to the cloud-based application may be released. For example, a canary release process, blue-green deployment, or any other release process may be used to manage deployment of the update to the cloud-based application. For example, the update to the cloud-based application may comprise a test release of a software update for the cloud-based application. In this example, a portion of the system users may be directed to the test release. By directing a portion of users to the test release, developers may be able to determine if there are bugs or other issues with the update to the cloud-based application. This may allow developers of the cloud-based application to determine if there are bugs or other issues with the update to the cloud-based application without deploying it to the entirety of the system users. Once the update has been deemed stable and effective, the rest of the system users may be directed to the update.

As an example, a first endpoint of the traffic manager may comprise a first instance of WSS on the CITRIX CLOUD™. System users from the United States may be directed, based on metadata indicating a geographic location of each system user, to the first instance. A second endpoint of the traffic manager may comprise a second instance of WSS on the CITRIX CLOUD™. System users from Europe may be directed, based on metadata indicating a geographic location of each system user, to the second instance. An update to WSS may be developed. The first endpoint may be disabled, and traffic from the United States may be routed, via the first traffic manager, to the second endpoint. This may allow system users from the United States to maintain access with WSS on the CITRIX CLOUD™ during the update. Once the traffic is rerouted to the second endpoint, the update may be deployed. For example, the resource records at the first endpoint may be updated to comprise resource records associated with the update to WSS. Once the update is in place, the first endpoint may be enabled, and the first global traffic manager may resume routing requests from the system users to one of the first endpoint and the second endpoint based on metadata. If the update is marked stable, a similar process may be used to deploy the update at the second endpoint. If the update is not marked stable, the update may be fixed, and redeployed, using the same process, to the first endpoint. Although FIG. 3 illustrates two instances of a cloud-based application, any number of instances, or updates, may be supported using the techniques described above. For example, the first global traffic manager may manage twenty instances and three updates. Additionally, although a single global traffic manager is described, multiple global traffic managers may be implemented. For example, the first global traffic manager, associated with a first geographic region, may route requests to sub-global traffic managers based on sub-regions within the first geographic region. For example, a first global traffic manager may route requests to based on whether they originated in the United States or Europe. Then, if the requests originated in the United States, they may be directed to one of a plurality of sub-global traffic managers based on whether the request originated on the west coast, the east coast, or in the middle of the country.

At step 336, after a predetermined interval, the system may determine whether one or more system users have migrated to a new geographic location that is not currently supported by an endpoint at the first global traffic manager. For example, the first endpoint may be associated with the United States and the second endpoint may be associated with Europe, but one or more system users may have migrated to Asia. The system may determine, based on metadata, whether the one or more system users migrated to the new geographic location. For example, a system user may request, from Asia, access to WSS via the Citrix Cloud. The first global traffic manager may analyze the request and may determine, based on metadata comprising the request, that the request was transmitted from Asia. For example, the first global traffic manager may analyze a geolocation associated with the request. The predetermined interval may be an amount of time, an amount of requests, or another predetermined period. The predetermined interval may be configurable by a system user. The system may determine that although a single user relocated to the new geographic location, a quantity of system users at that geographic location does not exceed a predetermined system user threshold. As a result, although a single user relocated, the system may not consider this a relocation for purposes of the decision at step 336. In another example, migration of a single user may be enough for the system to determine a relocation for purposes of the decision at step 336. If the system determines that a relocation has occurred, the system may proceed to step 339. If the system determines that a relocation has not occurred, the system may proceed to step 348.

At step 339, based on the determination at step 336 that a relocation has occurred, the system may create a third instance of the cloud-based application. Actions performed at step 336 may be similar to those described above with regard to step 312. For example, the system may copy the resource records associated with the first instance of the cloud-based application, and may modify, at the third instance, the service (SRV) records based on the new geographic region. For example, the first global traffic manager may determine that the relocation comprises a relocation to China. In this example, the third instance of the cloud application should serve users in China instead of the United States, which may be served by the first instance. In this example, the system may change a resource record of "<service>us.ctxwsstgapi.net" to "<service>cn.ctxwsstgapi.net."

At step 342, once the third instance is created, the system may create a third endpoint for the first global traffic manager. Actions performed at step 342 may be similar to those performed at step 315. Upon creation of the third endpoint, access to the third instance may not yet be enabled. For example, system users may not yet be able to access the third instance of the cloud-based application via the global traffic manager.

At step 345, once the third endpoint is created for the first global traffic manager, the system may enable the third endpoint. This may allow the first global traffic manager to route requests for the cloud-based application to one of the first instance, the second instance, and the third instance based on metadata associated with the requests. For example, if the first global traffic manager determines that a request for access was transmitted from China, the first global traffic manager may route the request to the third endpoint, thus fulfilling the request with the third instance of the cloud-based application. Actions performed at step 345 may be similar to those described above with regard to step 321. As described above with regard to step 321, by using the first global traffic manager to route requests, the system may create additional instances of a cloud-based application, and may use the first global traffic manager to redirect system users to those additional instances without causing downtime to the original system or system users. Also, as described above with regard to step 321, the first global traffic manager may use the different endpoints to facilitate deployment of updates to the cloud-based application. For example, the first global traffic manager may use at least one of the first endpoint, the second endpoint, and the third endpoint to perform a canary release process, blue-green deployment, or any other release process may be used to manage deployment of the update to the cloud-based application. For example, the update to the cloud-based application may comprise a test release of a software update for the cloud-based application. By using the first global traffic manager to enable and disable the various endpoints, the system may release updates to the cloud-based application without causing disruption to the end users. The first global traffic manager may be configured to enable and disable the various endpoints upon instruction from the system. Although FIG. 3 illustrates three instances of a cloud application, any number of instances, or updates, may be supported using the techniques described above. For example, the first global traffic manager may manage twenty instances and three updates.

Returning to step 309, if the system determines that the second instance of the cloud-based application should not be created, the system may proceed to step 324. For example, the system may determine that a majority of the requests for the cloud-based application originated in the particular geographic region and that a likelihood of increased traffic from other geographic regions is unlikely. In this example, the system may determine, after expiration of a predetermined interval, whether a system user relocation has occurred. For example, although the system may not have forecasted traffic from other geographic regions, the system may determine, after the predetermined interval, whether system users did in fact relocate to the other geographic regions. For example, the first global traffic manager may analyze metadata associated with requests, and may determine based on the metadata that system users are located in the other geographic regions. Actions performed at step 324 may be similar to those described above with regard to step 336. If the system determines that a system user relocation has occurred, the system may proceed to step 327 to generate a second instance of the cloud-based application. If the system determines that a system user relocation has not occurred, the system may proceed to step 348.

At step 327, the system may generate the second instance of the cloud-based application. For example, if the system determined, at step 324, that system users relocated to Europe, the system may generate a second instance of the cloud-based application for DNS requests from Europe. Actions performed at step 327 may be similar to those described above with regard to step 312 and 339.

At step 330, the system may create a global traffic manager with a first endpoint and a second endpoint. For example, the first endpoint may be associated with the original geographic region such as the United States, and the second endpoint may be associated with a different geographic region associated with the relocation such as Europe. Actions performed at step 330 may be similar to those described above with regard to step 315 and 342.

At step 331, the system may direct the DNS to the first global traffic manager, thus causing requests for the first instance of the cloud-based application to flow through the first global traffic manager, rather than directly to a server hosting the first instance of the cloud-based application. For example, requests from the system users to access the cloud-based application may now be directed to the first global traffic manager. Actions performed at step 318 may be similar to those described above with regard to step 318.

At step 333, the system may enable the second endpoint. Once enabled, the system may use the first global traffic manager to route requests to one of the first endpoint and the second endpoint based on metadata associated with the system user requesting the access to the cloud-based application. For example, the first global traffic manager may analyze a request and may determine, based on metadata, that the request originated in Europe. In this example, the first global traffic manager may route the request to the second endpoint, thus providing the system user with access to the second instance of the cloud-based application. This allows the cloud-based application to function as it did before, the difference being that the first global traffic manager now routes requests for the cloud-based application to one of a plurality of instances based on a geographic location. This allows creation of additional instances of the cloud-based application without causing downtime to the original system or system users. Actions performed at step 333 may be similar to those described above with regard to step 321 and 345. Although FIG. 3 illustrates two instances of a cloud application, any number of instances, or updates, may be supported using the techniques described above. For example, the first global traffic manager may manage twenty instances and three updates. Additionally, although a single global traffic manager is described, multiple global traffic managers may be implemented. For example, the first global traffic manager, associated with a first geographic region, may route requests to sub-global traffic managers based on sub-regions within the first geographic region. For example, a first global traffic manager may route requests to based on whether they originated in the United States or Europe. Then, if the requests originated in the United States, they may be directed to one of a plurality of sub-global traffic managers based on whether the request originated on the west coast, the east coast, or in the middle of the country.

At step 348, the system may determine whether a second service should be supported by the cloud-based application. For example, the system may determine that the first instance supports a first service of the cloud-based application, and that the second service may be of use to the system users. In this example, the system may proceed to step 354. If the system determines that a second service should not be supported by the cloud-based application, the system may end the method 300. As an example, the cloud-based application may comprise WSS, and potential services may comprise at least one of: websvcAdministration, websvcAlerts, websvcAuthentication, websvcCopy, and the like.

At step 351, based on the determination at step the system may create a new instance of the cloud-based application, at each endpoint, for the second service. For example, rather than merely having one instance of the cloud-application at each endpoint, the system may store two instances of the cloud-based application at each endpoint. One for the first service and one for the second service.

At step 354, the system may create a new global traffic manager at each endpoint. For example, the system may create a second global traffic manager, a third global traffic manager, and a fourth global traffic manager for the first endpoint, the second endpoint, and the third endpoint respectively. Each of these new traffic managers may have two endpoints, one for each supported service. For example, the second global traffic manager may comprise a fourth endpoint and a fifth endpoint, the third global traffic manager may comprise a sixth endpoint and a seventh endpoint, and the fourth global traffic manager may comprise an eighth endpoint and a ninth endpoint respectively. The fourth endpoint, the sixth endpoint, and the eighth endpoint may be associated with the first service, and the fifth endpoint, the seventh endpoint, and the ninth endpoint may be associated with the second service. Upon creation of the new traffic managers, the fourth endpoint, the sixth endpoint, and the eighth endpoint may be enabled, and the fifth endpoint, the seventh endpoint, and the ninth endpoint may be disabled.

At step 357, the system may instruct the first global traffic manager to direct requests to one of the second global traffic manager, the third global traffic manager, and the fourth global traffic manager. For example, the first global traffic manager may analyze metadata comprising the requests to determine a geolocation associated with each request. The first global traffic manager may direct the requests based on the determined geolocations.

At step 360, the system may enable the fifth endpoint, the seventh endpoint, and the ninth endpoint respectively. Once enabled, the system may use the new global traffic managers to direct requests to one of to the fourth endpoint, the fifth endpoint, the sixth endpoint, the seventh endpoint, the eighth endpoint, and the ninth endpoint based on metadata associated with the system user requesting the access to the cloud-based application. For example, if the metadata indicates that the system user is located in the United States, the first global traffic manager may route the request to the second global traffic manager, thus providing the user with access to an instance of the cloud-based application for the first service and an instance of the cloud-based application for the second service. If the request comprises a request for the first service, the second global traffic manager may route the request to the fourth endpoint, which may grant the system user access to the first service of the cloud-based application.

In another example, if the metadata indicates that the system user is located in Europe, the first global traffic manager may route the request to the third global traffic manager, thus providing the system user with access to an instance of the cloud-based application for the first service and an instance of the cloud-based application for the second service. If the request comprises a request for the second service, the second global traffic manager may route the request to the seventh endpoint, which may grant the system user access to the second service of the cloud-based application. By allowing the global traffic managers to route DNS requests, the system allows creation of additional instances based on new geographic locations, new services, and the like, without causing downtime to the original system or system users. Although four traffic managers and nine endpoints are discussed with regard to FIG. 3, it should be understood that any number of global traffic managers and endpoints may be used. Furthermore, although steps 303-360 are shown in an exemplary order, it should be understood that the steps 303-360 may occur in any order or at any time throughout the method 300.

Figure 4A:
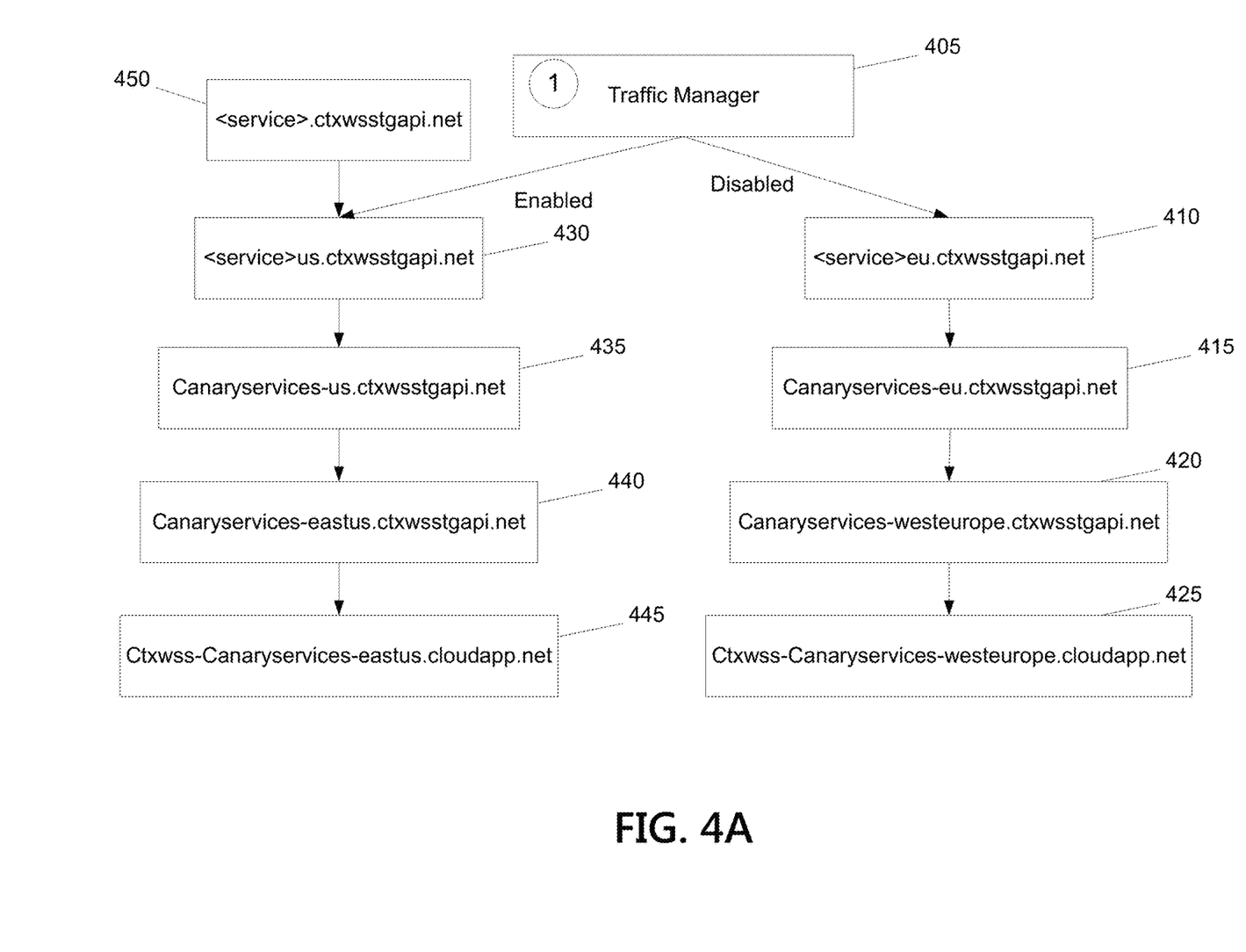
FIG. 4A illustrates creation of a global traffic manager comprising two endpoints in accordance with one or more illustrative aspects described herein.

FIG. 4A illustrates creation of a global traffic manager 405 comprising two endpoints in accordance with one or more illustrative aspects described herein. A DNS may transmit a request 450 for access to an application via a cloud-based service. For example, a user may request access to an application such as WSS via the CITRIX CLOUD™. Prior to creation of the traffic manager 405, the DNS may be directed towards a server, such as a canary server, that provides access to the application via the cloud-based service. For example, the server may store resource records 430-445 associated with WSS and the CITRIX CLOUD™. The resource records 430-445 may comprise a first instance of WSS on the CITRIX CLOUD™. The first instance of WSS may be requested by system users located in the Eastern United States. Resource records 410-425 may comprise a second instance of WSS on the CITRIX CLOUD™. For example, the second instance of WSS may be requested by system users located in Western Europe. Upon creation of the global traffic manager 405, the first instance may be located at the first endpoint, which may be enabled, and the second instance may be located at the second endpoint, which may be disabled. The traffic manager 405 may comprise the first global traffic manager described above with regard to step 315. The resource records 430-445 may comprise the first instance of the cloud-based application, described above with regard to step 303. The resource records 410-425 may comprise the second instance of the cloud-based application, described above with regard to step 312.

Figure 4B:
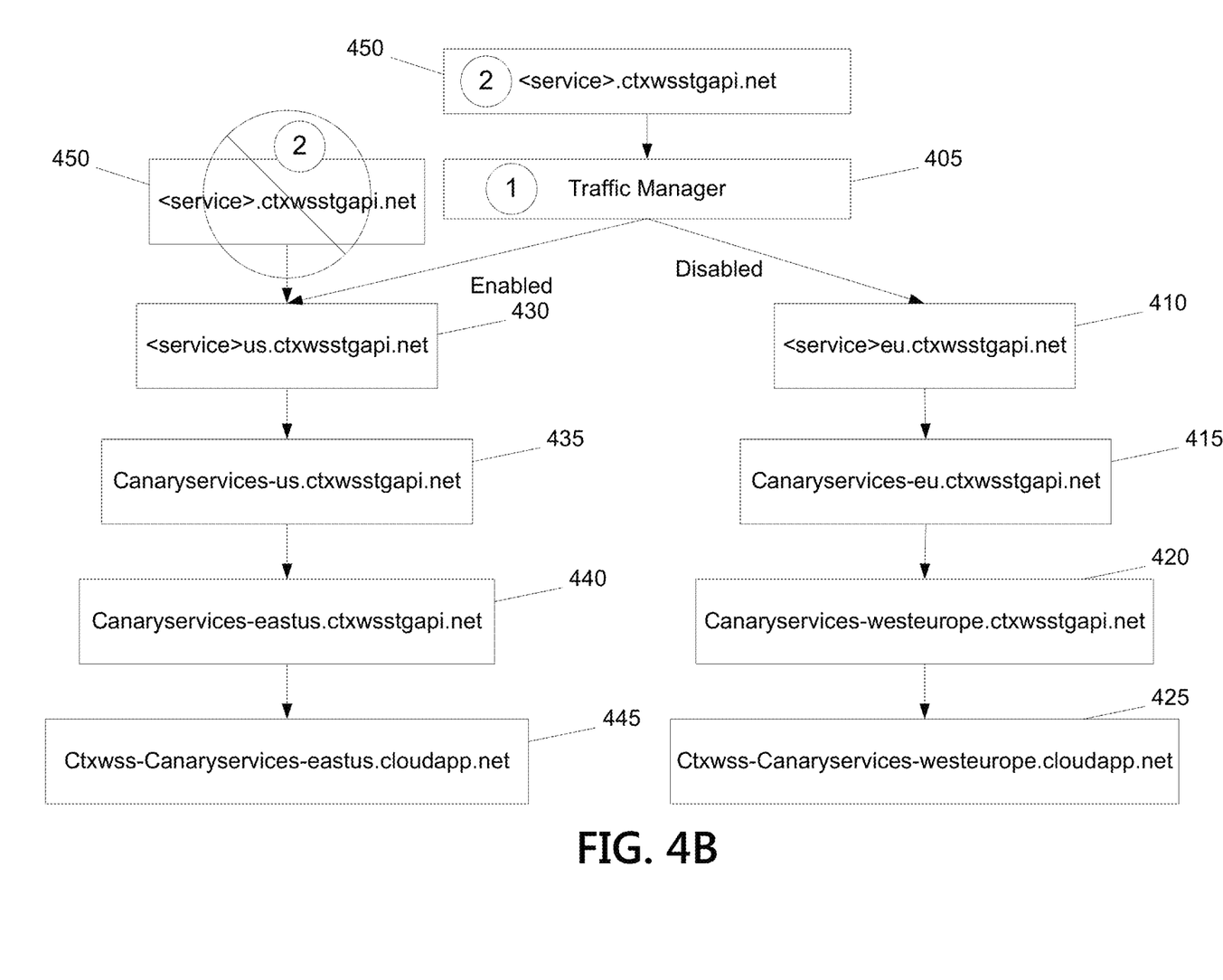
FIG. 4B illustrates redirection of a query to a global traffic manager in accordance with one or more illustrative aspects described herein.

FIG. 4B illustrates redirection of a query to a global traffic manager in accordance with one or more illustrative aspects described herein. For example, as described above with regard to FIG. 4A, a DNS may request access to an application via a cloud-based service. For example, a user may request access to an application such as WSS via the CITRIX CLOUD™. A DNS may receive the request, and rather than transmitting the request 450 to a server as in FIG. 4A, the DNS may transmit the request 450 to the traffic manager 405. In this example, rather than directly accessing the first instance as in FIG. 4A, the DNS accesses the first instance via the global traffic manager 405. At this point, the first endpoint (resource records 430-445) may be enabled and the second endpoint (resource records 410-425) may still be disabled. The traffic manager 405 may comprise the first global traffic manager described above with regard to step 315. The resource records 430-445 may comprise the first instance of the cloud-based application, described above with regard to step 303. The resource records 410-425 may comprise the second instance of the cloud-based application, described above with regard to step 312. FIG. 4B illustrates the actions performed at step 318, at which point the DNS is directed to the first global traffic manager.

Figure 4C:
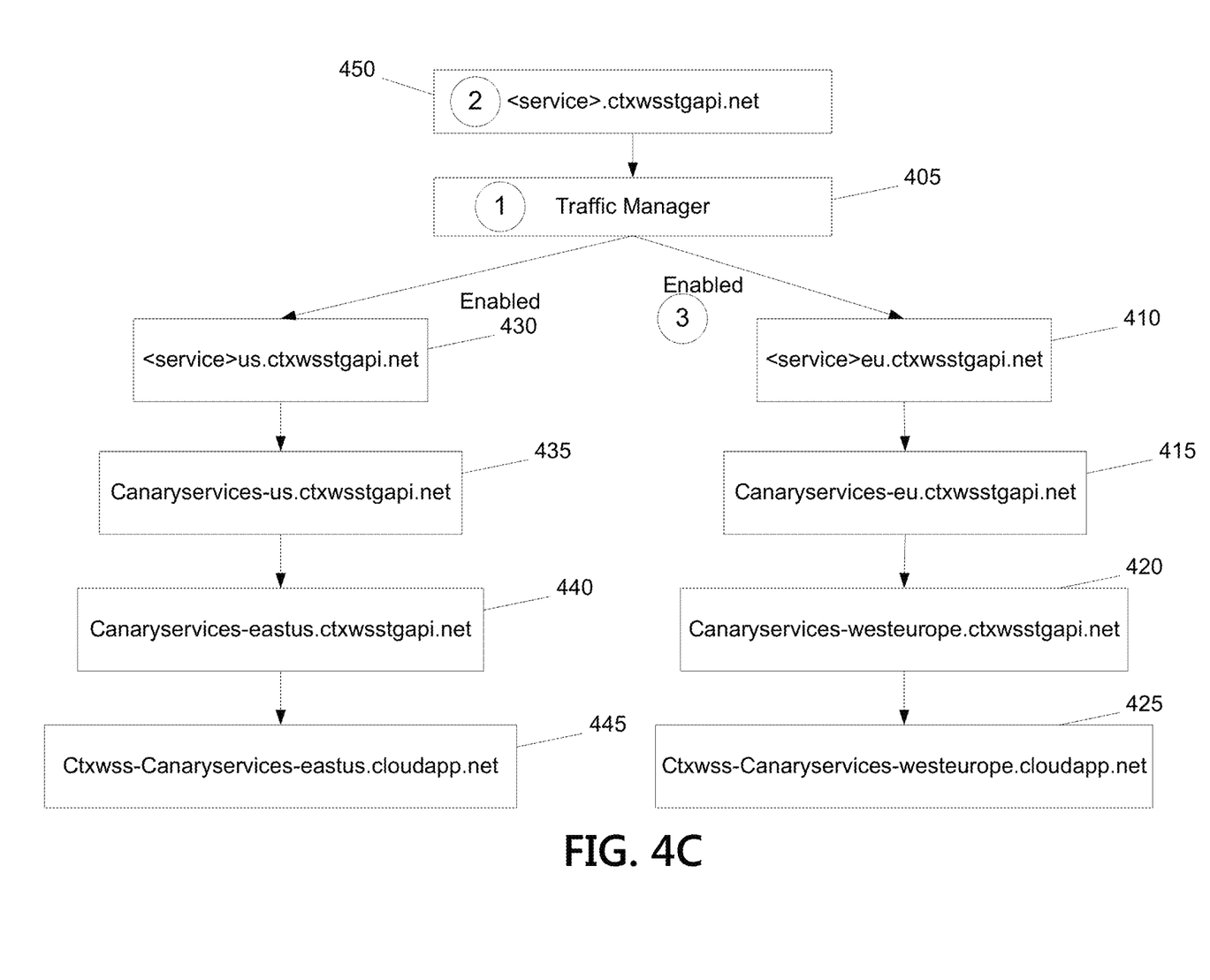
FIG. 4C illustrates enablement of a second endpoint associated with a global traffic manager and redirection of a query, via the global traffic manager, to one of a first endpoint and a second endpoint.

FIG. 4C illustrates enablement of a second endpoint associated with a global traffic manager and redirection of a query, via the global traffic manager, to one of a first endpoint and a second endpoint. At this point, the first endpoint and the second endpoint may both be enabled. For example, as described above with regard to FIGS. 4A-4B, a DNS may request access to an application via a cloud-based service. For example, a user may request access to an application such as WSS via the CITRIX CLOUD™. The DNS may transmit the request 450 to the global traffic manager 405, which may route the query to the first endpoint or the second endpoint based on metadata comprising the query. For example, the global traffic manager 405 may determine a geolocation associated with the query or a requested service associated with the query. Based on this determination, the global traffic manager 405 may route the request 450 to one of the first endpoint and the second endpoint, which may comprise an appropriate instance of the cloud application. For example, the global traffic manager may determine that a geolocation associated with the request 450 comprises the Eastern United States. In this example, the global traffic manager 405 may route the request 450 to the first endpoint. In another example, the global traffic manager may determine that a geolocation associated with the request 450 comprises Western Europe. In this example, the global traffic manager may route the request to the second endpoint. The traffic manager 405 may comprise the first global traffic manager described above with regard to step 315. The resource records 430-445 may comprise the first instance of the cloud-based application, described above with regard to step 303. The resource records 410-425 may comprise the second instance of the cloud-based application, described above with regard to step 312. FIG. 4C illustrates the actions performed at step 321, at which point both the first endpoint and the second endpoint are enabled, and the first global traffic manager may route requests to either endpoint.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   deploying a cloud application comprising a first instance of the cloud application, wherein the cloud application comprises a plurality of cloud services;
   causing a domain name system (DNS) to direct requests for the cloud application to the first instance of the cloud application;
   determining that a second instance of the cloud application should be deployed;
   creating a first global traffic manager configured with at least a first endpoint and a second endpoint, wherein the first endpoint is associated with the first instance and the second endpoint is associated with the second instance;
   determining that a second service of the plurality of cloud services should be supported by the first instance;
   creating, at the first endpoint, a second global traffic manager configured with a least a third endpoint and a fourth endpoint, wherein the third endpoint is associated with a first service of the first instance and the fourth endpoint is associated with the second service of the first instance;
   directing, from the DNS and from the first global traffic manager of the first instance, requests for the cloud application received at the first endpoint to the second global traffic manager; and
   directing, based on metadata associated with each of a plurality of users and based on a requested service, each of the plurality of users to one of a plurality of enabled instances of a requested service, wherein one or more users are directed to each of the plurality of enabled instances of a requested service.

2. The method of claim 1, wherein the first endpoint is associated with a first geographic region and the second endpoint is associated with a second geographic region.

3. The method of claim 2, further comprising:
   determining, based on the metadata, that the one of the plurality of users has relocated from the first geographic region to a third geographic region;
   creating, based on the determining that the one of the plurality of users has relocated, a third instance of the cloud application for the third geographic region;
   creating a fifth endpoint associated with the third instance of the cloud application, wherein the fifth endpoint is disabled;
   enabling the fifth endpoint; and
   directing, based on the metadata, the one of the plurality of users to the third instance.

4. The method of claim 2, wherein the first global traffic manager comprises a switching mechanism that enables geographic load distribution and diverts the plurality of users to a plurality of geographic regions including at least the first geographic region and the second geographic region.

5. The method of claim 4, wherein the switching mechanism does not cause disruption to the cloud application or the plurality of users.

6. The method of claim 1, wherein the second endpoint is enabled based on a determination that the second instance of a first service of the cloud application should be deployed.

7. The method of claim 6, further comprising:
   determining that the second instance of the cloud application should be deployed based on a predictive model indicating that traffic of the first instance will exceed a threshold.

8. The method of claim 1, wherein the deploying comprises deploying, prior to the creation of the first global traffic manager, the cloud application.

9. The method of claim 1, wherein the cloud application comprises a DNS based web service comprising at least one cloud-based application uniform resource locator (URL).

10. The method of claim 9, wherein the at least one cloud-based application URL is known by the plurality of users.

11. A computing platform, comprising:
    at least one processor;
    a communication interface communicatively coupled to the at least one processor; and memory storing computer-readable instructions that, when executed by the at least one processor, cause the computing platform to:

deploy a cloud application comprising a first instance of the cloud application wherein the cloud application comprises a plurality of cloud services;

cause a domain name system (DNS) to direct requests for the cloud application to the first instance of the cloud application;

determine that a second instance of the cloud application should be deployed;

create a first global traffic manager configured with at least a first endpoint and a second endpoint, wherein the first endpoint is associated with the first instance and the second endpoint is associated with the second instance;

determine that a second service of the plurality of cloud services should be supported by the first instance;

create, at the first endpoint, a second global traffic manager configured with a least a third endpoint and a fourth endpoint, wherein the third endpoint is associated with a first service of the first instance and the fourth endpoint is associated with the second service of the first instance;

direct, from the DNS and from the first global traffic manager of the first instance, requests for the cloud application received at the first endpoint to the second global traffic manager; and direct, based on metadata associated with each of a plurality of users and based on a requested service, each of the plurality of users to one of a plurality of enabled instances of a requested service, wherein one or more users are directed to each of the plurality of enabled instances of a requested service.

12. The computing platform of claim 11, wherein the first endpoint is associated with a first geographic region, the second endpoint is associated with a second geographic region, the first global traffic manager comprises a switching mechanism that enables geographic load distribution and diverts the plurality of users to a plurality of geographic regions including at least the first geographic region and the second geographic region, and the switching mechanism does not cause disruption to the cloud application or the plurality of users.

13. The computing platform of claim 12, wherein the memory stores additional computer-readable instructions, that when executed by the at least one processor, cause the computing platform to:

determine, based on the metadata, that one of the plurality of users has relocated from the first geographic region to a third geographic region;

create, based on the determining that the one of the plurality of users has relocated, a third instance of the cloud application for the third geographic region;

create a fifth endpoint associated with the third instance of the cloud application, wherein the fifth endpoint is disabled;

enable the fifth endpoint; and direct, based on the metadata, the one of the plurality of users to the third instance.

14. The computing platform of claim 11, wherein the second endpoint is enabled based on a determination that the second instance of a first service of the cloud application should be deployed, wherein the memory stores additional computer-readable instructions, that when executed by the at least one processor, cause the computing platform to:

determine that the second instance of a first service should be deployed based on a predictive model indicating that traffic of the first instance will be exceeded.

15. The computing platform of claim 11, wherein the memory stores additional computer-readable instructions, that when executed by the at least one processor, cause the computing platform to:

deploy the cloud application by deploying, prior to the creation of the first global traffic manager, the cloud application.

16. The computing platform of claim 11, wherein the cloud application comprises a DNS based web service comprising at least one cloud-based application uniform resource locator (URL) and wherein the at least one cloud-based application URL is known by system users.

17. One or more non-transitory computer-readable media storing instructions that, when executed by a computing platform comprising at least one processor, memory, and a communication interface, cause the computing platform to:

deploy a cloud application comprising a first instance of the cloud application, wherein the cloud application comprises a plurality of cloud services;

cause a domain name system (DNS) to direct requests for the cloud application to the first instance of the cloud application;

determine that a second instance of the cloud application should be deployed;

create a first global traffic manager configured with at least a first endpoint and a second endpoint, wherein the first endpoint is associated with the first instance and the second endpoint is associated with the second instance;

determine that a second service of the plurality of cloud services should be supported by the first instance;

create, at the first endpoint, a second global traffic manager configured with a least a third endpoint and a fourth endpoint, wherein the third endpoint is associated with a first service of the first instance and the fourth endpoint is associated with the second service of the first instance;

direct, from the DNS and from the first global traffic manager of the first instance, requests for the cloud application received at the first endpoint to the second global traffic manager; and direct, based on metadata associated with each of a plurality of users and based on a requested service, each of the plurality of users to one of a plurality of enabled instances of a requested service, wherein one or more users are directed to each of plurality of enabled instances of a requested service.

18. The one or more non-transitory computer-readable media of claim 17, wherein the first endpoint is associated with a first geographic region, the second endpoint is associated with a second geographic region, the first global traffic manager comprises a switching mechanism that enables geographic load distribution and diverts the plurality of users to a plurality of geographic regions including at least the first geographic region and the second geographic region, and the switching mechanism does not cause disruption to the cloud application or the plurality of users.

19. The one or more non-transitory computer-readable media of claim 18, wherein the memory stores additional computer readable media storing instructions, that when executed by the at least one processor, cause the at least one processor to:

determine, based on the metadata, that one of the plurality of users has relocated from the first geographic region to a third geographic region;

create, based on the determining that the one of the plurality of users has relocated, a third instance of the cloud application for the third geographic region;

create a fifth endpoint associated with the third instance of the cloud application, wherein the fifth endpoint is disabled;

enable the fifth endpoint; and direct, based on the metadata, the one of the plurality of users to the third instance.

20. The one or more non-transitory computer-readable media of claim 17, wherein the second endpoint is enabled based on a determination that the second instance of a first service of the cloud application should be deployed, wherein the memory stores additional computer readable media storing instructions, that when executed by the at least one processor, cause the at least one processor to:

determine that the second instance of the first service should be deployed based on a predictive model indicating that traffic of the first instance will be exceeded.

\* \* \* \* \*